INVENTORS
WILLIAM W. GARTH, JR.
ELLIS P. HANSON
BY Wangaten, Crosluch & Pandiscio
ATTORNEYS INVENTORS
WILLIAM W. GARTH, JR.
ELLIS P. HANSON
BY
Weingarten, Orenbuch & Pandiscio
ATTORNEYS

INVENTORS
WILLIAM W. GARTH, JR.
ELLIS P. HANSON
BY
ATTORNEYS

INVENTORS
WILLIAM W. GARTH, JR.
ELLIS P. HANSON
BY Weingarten, Orenbuch & Pandiscio
ATTORNEYS INVENTORS
WILLIAM W. GARTH, JR
ELLIS P. HANSON
BY Wenzelton, Auerbach & Anderson
ATTORNEYS United States Patent Office 3,307,154

Patented Feb. 28, 1967

3,307,154

DATA PROCESSING APPARATUS FOR LINE JUSTIFICATION IN TYPE COMPOSING MACHINES

William W. Garth, Jr., Concord, and Ellis P. Hanson, Rockport, Mass., assignors to Compugraphic Corporation, Reading, Mass., a corporation of Massachusetts Continuation of application Ser. No. 229,810, Oct. 11, 1962. This application Dec. 10, 1963, Ser. No. 329,597
17 Claims. (Cl. 340—172.5)

This invention relates in general to the graphic arts, and more particularly to data processing apparatus producing output signals for controlling a typesetting process. The present application is a continuation of application Serial No. 229,810, filed October 11, 1962, for "Data Processing Apparatus."

High speed typesetting is now generally accomplished by machines which are operated by perforated tape control. The machines themselves may fall into one of the several categories, such as hot metal, slug casting machines, hot metal machines which cast individual type characters in series, photographic composition machines and tape operated typewriters. These machines are capable of composing lines of type of varying type faces and type cases, depending upon the activation called for by the coding in the input perforated tape.

In any piece of composition each of the lines must have the same length. Since different characters, in typographical fonts, have different widths, the typesetting process must include some means of varying the width of spacing within the line in order to provide a series of equal length lines. When a series of lines are all the same length, they are referred to as "justified" to the resultant measure.

The keyboards which perforate tape for line casting machine operation include counting mechanisms which take into account the different widths of the characters and the minimum width and expansion possibilities of the space bands which are used for interword spacing. The counting mechanism provides a visual indication of the operator when the line being keyboarded includes sufficient characters so that it may be justified by the expansion of the space bands within the line. When the keyboard operator recognizes from the visual indicator that the line is within the desired range for justification, he strikes particular control keys providing codes in the perforated tape indicating the end of the line. In a line casting machine, both a return code indicating the end of the line and elevate code to actuate operation of the assembly elevator are coded at the end of each line.

The variable space element in a line casting machine is a "space band" which is provided at each interword point in the line. Space bands are formed in a wedge-shape. In the line casting machine, when the end of line signals are received, the character matrices and space bands which have been accumulated at the assembly elevator, are transferred to a casting position between two jaws separated by a fixed, predetermined distance. A justification bar then forces the space bands upward wedging the character matrices in both directions until the right and left-hand matrices are snug against the jaws, thus justifying the line.

In regular typewriting, the operator's time, for the most part is involved with the selection of alpha-numeric characters and the grouping of these into words, sentences, paragraphs, and the like through the use of punctuation and spaces. Thus, normal copying can be said to involve chiefly the informational content from the "copy" or dictation. On the other hand, perforated tape for the control of typesetting machines involves the keyboarding of this same informational content and additionally requires the keyboarding of control codes. As above indicated, the justification process is one which requires the attention and decision of the keyboard operator in order to determine at what point within the desired range of justification the line should be terminated.

The complexity of keyboard perforation resulting from the addition of these non-informational coding and justification processes renders the perforation of tape for control of typesetting machines a far slower process than normal typewriting, as well as one that is considerably more subject to error. Thus, keyboard perforating requires almost twice the time of normal typewriting, and is more subject to error, yet it involves many more skills on the part of the perforator operator. The copy supplied to the perforator operator is usually already in typewritten form and hence the keyboarding of the material for typesetting purposes represents a duplication since it is a second keyboarding of all of the informational content.

It is, therefore, a primary object of the present invention to provide a data processing apparatus which produces a typesetting control tape from a tape which may be produced as a by-product of regular typewriting of copy.

It is another object of the present invention to provide a data processing apparatus which converts tape which has been perforated for the operation of typesetting machines in one type face and one line length into a new tape suitable for operating typesetting machines at different line length and with different type faces.

It is still another object of the present invention to provide a data processing apparatus whereby a perforated tape representing the typewritten copy may be prepared prior to any decision as to line length and type face, which tape may be converted into a tape containing the appropriate format of line length and type face without the necessity of rekeyboarding the informational content.

Broadly speaking, the data processing apparatus of this invention translates input tape, which has been coded only with the informational content of the material to be typeset, into a coded output tape which contains the control codes to provide justified lines in paragraph form. The data processing apparatus may also operate on input tape which is "typesetting machine tape" but wherein, in the final composition the type face of the line length, or both are to be altered. Tape of the first type, that is, containing codes representing keys struck in the normal typewriting process, is referred to as "running tape." Input tape of the second type, that is, which already contains controls for the typesetting process is referred to as "typesetting machine tape." In both instances, the data processing apparatus not only recognizes codes which must appear on the output tape, but also ignores those control codes appearing in the input tape which do not belong in the altered output tape. The data processing apparatus recognizes the beginning and ending of the paragraph by recognition of fixed space codes, which in a "running tape" follow a "return code," or a special signal, or which in a typesetting machine tape, follow return and elevate codes.

The data processing apparatus automatically computes the width values of characters and spaces in a line and automatically terminates the line within justification range of a predetermined length if an interword or a hyphen occurs within justification range of this predetermined length. In those cases where the predetermined line length does not occur at an interword point, the processing apparatus provides a semi-automatic hyphenating system.

Other objects and advantages will become apparent from the following detailed description when taken in conjunction with the accompanying drawings in which.

Figure 1:
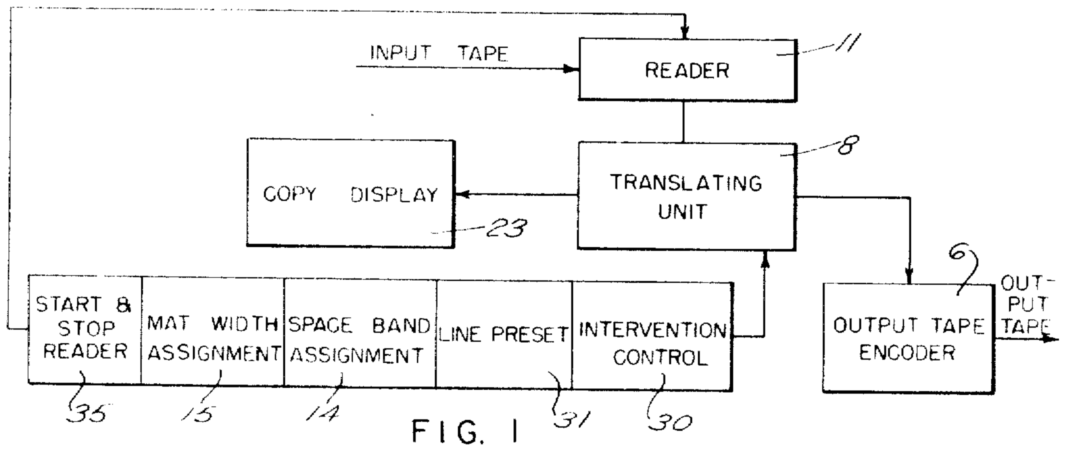
FIG. 1 is an illustration in block diagrammatic form of a data processing apparatus in accordance with the principles of this invention.

Referring now specifically to FIG. 1, the data processing apparatus is illustrated from an operational point of view. The input tape 10 which, as above indicated may be coded either as perforated "running tape" or "type setting tape," is applied to a reader unit 11. The reader unit 11 provides coded output signals in response to the code on the input tape. The output signals from reader 11 are provided to translating unit 8, which in turn provides output signals to a copy display element 23 and an output tape coder 6. A series of monitor controls consisting of: a start and stop reader 35, a mat width assignment unit 15, a space band assignment unit 14, a line preset 31, and an intervention control 30, provide control signals to both translating unit 8 and the reader 11. In operation, the mat width assignment unit 15 and the space band assignment unit 14 are set for the particular type face and size and space band which are to be employed and the line preset unit 31 is adjusted to the desired line measure. The start-stop reader 35 is then started initiating the action of reader 11 which commerces to read the input tape 10 and to provide the output signals to the translaing unit 8.

All output lines which may be ended at the preselected line length within the variation of the space band range are then automatically coded on the output tape by the output tape coder 6 without any operator intervention. Any line which requires hyphenation will cause the input reader 11 to stop on that character, the width of which when added to the width of all the characters and minimum space band widths assigned to that particular line, exceeds the desired line length. This character, which cannot be included within the particular line, will be indicated on display copy unit 23.

Copy display unit 23 displays "hard copy," that is, the copy in typewritten form, produced from the original keyboarding or subsequent processing of running tape or of "type setting machine tape." Above the hard copy is a series of lights, each spaced a character width apart in correspondence with the hard copy. As the characters progress through the translating unit 8, the light in the copy display unit 23, corresponding to each character is illuminated. When the input reader 11 stops, then the light corresponding to the excess character is illuminated. At this point, the operator may make a hyphenation decision and insert, by means of intervention control 30, a hyphen at the appropriate point in the last word of the just completed line, or if no appropriate hyphenation point occurs, the operator may terminate the line at the last interword point. When the intervention control 30 has been actuated, the line is then coded on the output coder 6 and automatic operation again commences.

Figure 2:
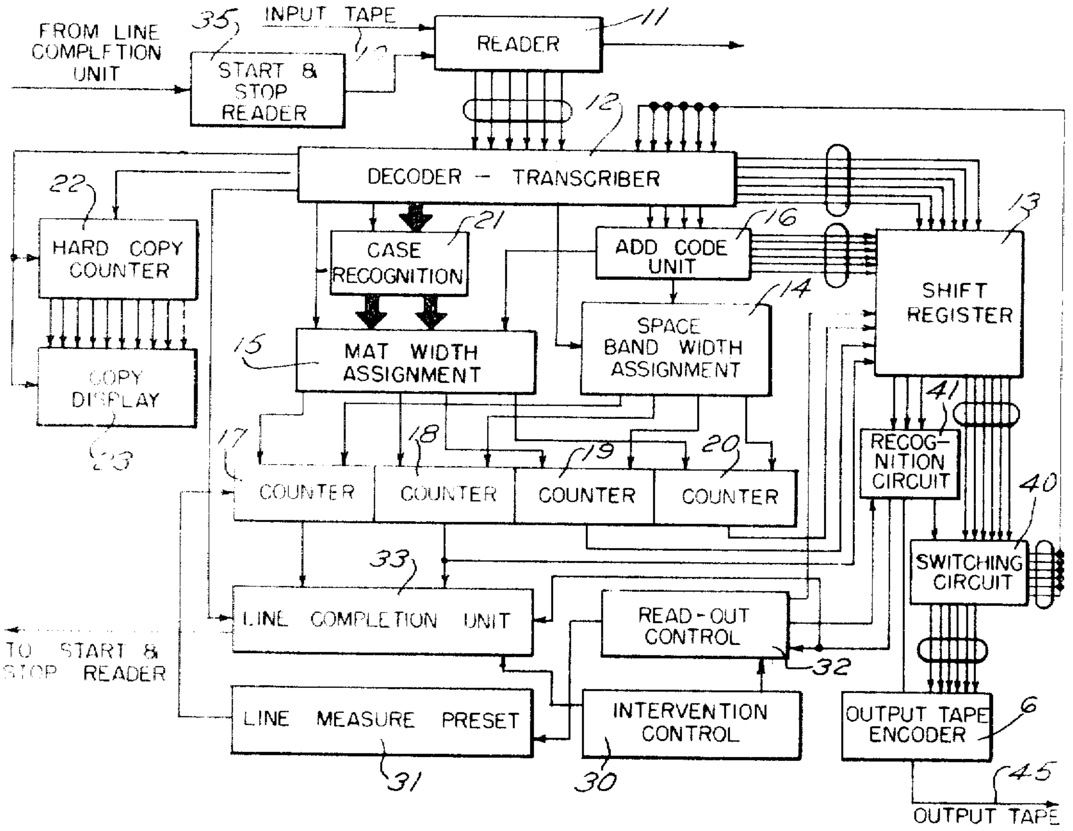
FIG. 2 is an illustration in block diagrammatic form of a more detailed nature of a data processing apparatus in accordance with the principles of this invention.

Referring now to FIG. 2 a more detailed block diagram of the data processing apparatus is illustrated. The basic operational sequence of the apparatus shown in FIG. 2 is the same as that in FIG. 1. In order that this invention will be more clearly understood the system is first described in functional terms then the procedural operation is discussed and finally specific examples of suitable apparatus are set forth.

*Description of the system*

The input tape 10 is flowed through the reader 11 with the speed and continuity of the flow being controlled by the reader 11. The input tape 10 may be either perforated or otherwise coded. The reader 11 provides an electrical signal in six-bit parallel form as an output representing the information read from the input tape. This binary parallel output is coupled to a decoder-transcriber unit 12. The decoder-transcriber unit 12 includes a tree circuit which provides individual output leads for selected code inputs. In addition this unit includes a code repeater which repeats all of the input codes with the exception of certain specified codes representing hyphens, fixed space, return, elevate, no code, and deletion. The repeated codes are transferred into shift register 13 through a delay unit within the decoder-transcriber. The delay unit delays the repetition of these codes by a time less than the time required for the input reader 11 to read one character. In addition to the above outputs from the decoder-transcriber, certain common outputs are provided; that is, an output line which carries a signal every time any one of a number of selected input codes are applied to the transcriber. One such common line is provided to hard copy counter 22 and carries a signal each time the decoder-transcriber receives a code representing a character or space in the hard copy corresponding to the coded input tape 10.

The hard copy counter 22, which will be described in more detail below in connection with a specific description of the copy display unit 23, is essentially a register which changes state in response to each input signal. An additional lead is provided from the decoder-transcriber 12 to the hard copy counter 22 which carries a signal only when a code is received by the decoder-transcriber 12 corresponding to a "return" or "return and elevate" or any end of line signal. This second lead to the hard copy counter resets the register to zero. The state of the register then corresponds to the spatial position of the incoming signal from the reader 11 within a line of the hard copy. This spatial position is indicated on the copy display unit 23.

The remainder of the common outputs and the individual outputs from the decoder-transcriber 12 are applied to units which determine the width value of the individual characters to the line completion unit 33 and to an add code unit 16, which latter unit provides additional codes to the shift register 13 in connection with end of the line codes which are on the input tape. In the assignment of width values, both the space band values and two groups of character values must be treated. An individual lead from the decoder-transcriber 12 is actuated for each input code representing a space band and this individual lead is applied to a space band width assignment unit 14. The space band width assignment unit provides numerial outputs for each input signal it receives from the decoder-transcriber 12. Four such numerical outputs are provided from the space band width assignment unit 14 and the value of each output is dependent upon the unit to which the individual output is provided. Thus, to counter 17 the numerical value represents the minimum space band width for the type face which has been selected, while to counter 18 the numerial value represents the maximum space band width. The numerical values to counter 19 represent the maximum space band width plus a value representing one thin space while those to counter 20 represent the maximum space band value plus the value of one en space.

The individual output leads from the decoder-transcriber 12, which represent character or space codes, are divided into two groups, those which represent different characters in upper case than they do in lower case, and those which represent the same character in both upper and lower case. There are eight codes that represent the same character or space in both upper and lower case and the eight individual leads representing these codes are coupled from the decoder-transcriber 12 directly to a mat width assignment unit 15. The individual leads from decoder-transcriber 12 representing the forty-one codes whose character representation depends upon their case are applied to a case recognition unit 21, to which is also supplied a signal from decorder-transcriber 12, indicative of an "upper case" or "lower case" control signal on the input tape. This unit then determines the case of the coded character and provides eight-two individual output leads to mat width assignment unit 15, forty-one representing upper case characters and forty-one representing lower case characters.

In response to each individual input character applied to it, mat width assignment unit 15 provides an output signal representing the numerical value of the width of this character to each of the counters 17, 18, 19, and 20. The width value assigned to each of the characters is assigned in accordance with the type face which is to be used in th typesetting process. Each of the counters 17, 18, 19 and 20 is preset so that it provides an overflow output signal when it has accumulated the preset total numerical value. This value is assigned from the line measure preset unit 31 and the basis of selection is the length of line which is to be type set. At the completion of each line, each of these counters is reset to its initial conditions. As a series of characters are translated by the reader and processed through the decoder-transcriber 12, counter 20 will first reach its limit since it has applied to it, in addition to the width values for the characters, the maximum width value for space bands plus the width value for an en space. Counters 19, 18, and 17 in that order, will then reach their limits, since counter 19 has numerical values for maximum space bands plus thin space, counter 18 for maximum space band and counter 17 for minimum space bands.

The add code unit 16, referred to above, has the function of providing codes to the shift register 13 to adjust for the end of line signals from the originad input tape. Since the output tape is coded in terms of justified lines which, in general, will include a different number of characters than the line coded on the input tape, some provision must be made for removing the end of line signals from the input codes and replacing them with normal interword codes. The decoder-transcriber 12 provides four signals to the add code unit 16. One of these signlas is a common signal which is provided in response to each character signal applied to the decoder-transcriber 12. The other signals are, an individual signal representing a return code, an individual signal representing the code indicative of a hyphen, and an individual signal representing a fixed space. The add code unit 16, in response to particular combinations of signals on these leads, provides, from its memory storage, output codes which are transferred into the shift register 13. At the same time, the add code unit 16 provides to either the mat width assignment unit 15 or the space band width assignment unit 14 an appropriate input in order to include the width of the characters added by the add code unit 16 in the tabulation of total line width.

As previously indicated, the majority of the character codes received by the decoder-transcriber 12 are repeated and transferred into shift register 13. The only character code which is not repeated is the hyphen and, in addition, control codes and fixed space codes are not usually repeated. The shift register 13 has nine parallel channels, each channel having a storage capacity of several bits, for example, 12 bits. Each of the six leads carrying the binary repeated code from decoder-transcriber 12 is applied to an individual one of six of these channels. The output from these six channels is coupled through a switching circuit 40 either to output encoder 6 or, when the switching circuit is in the recirculation position, back to the input of the decoder-transcriber until 12. These same six channels in shift register 13 may also receive an input from add code unit 16, which either takes the place of a non-repeated code from decoder-transcriber 12 or adds a character code in place of a control code. The shift register 13 typical operates on a clock pulse which also provides the timing basis for progress of the input tape 10 through the reader 11.

As above stated, the outputs from the six channel shift register 13 which carry the code repeated from the decoder-transcriber 12, are applied through the switching circuit 40 to the output encoder 6. The output encoder 6 in response to these input codes perforates or otherwise codes an output tape adapted to control a typesetting machine such as a line casting machine.

Two of the remaining three channels in shift register 13 receive, as their input, signals from counters 18, 19, and 20, which are then carried along in parallel with the character for which the width assignment filled up the respective one of these counters. Thus, for example, when the limit on counter 20 is reached, an indicating signal may be impressed at the input of the seventh channel in parallel, with the code in the previous six channels. Similarly, for counter 19 a signal may be impressed in the eighth channel, while no signal is impressed in the seventh channel, thus indicating that the character in parallel with these signals filled up the counter 19 and a signal may be simultaneously entered in both the seventh and eighth channels indicating that counter 18 has been filled up. As will be explained hereafter, the ninth channel is used to identify the line ending character when it is selected semi-automatically. The outputs of these three channels of shift register 13 are provided to a recognition circuit 41.

When the limit on counter 17 is reached, no output is provided to the shift register directly, but rather a signal indicative of this limit being reached is applied to line completion unit 33 which provides a stop signal to the reader 11 so that no more information is provided to the apparatus. The line completion unit 33 also provides a signal to readout control 32. The exact function of readout control 32 will be explained in connection with the description of the automatic and semi-automatic line ending procedures.

*Procedural operation*

In operation, the system shown in FIG. 2 and described above performs semi-automatically, that is, some functions are performed by an operator. In order to initiate operation the entire apparatus is reset so that each of the counters 17, 18, 19 and 20 are reset to their initial condition. The hard copy is set up in the copy display unit 23, and the hard copy counter 22 is reset to zero. The line length which has been selected is entered into the system through line measure preset unit 31 and the mat width assignment unit 15 and space band width assignment unit 14 are adjusted for the particular type face being employed. Having established the preset conditions, the reader 11 is now started and commences to translate the code on the input tape 10 and provide binary coded signals to the decoder-transcriber 12. Output signals are then provided from the decoder-transcriber 12 to both of the width assignment units and to the shift register. Since the shift register has a limited memory, typically twelve bits, and since a typical line length might include forty or fifty characters, the initial characters in each line are processed through the shift register and encoded in the output encoder.

There are two situations in which this normal flow of coded information from the input reader 11 to the output encoder 6 is interrupted. One such situation occurs in connection with end of line signals appearing on the input tape and the other situation occurs when the predetermined line length for the output copy is reached.

End of line signals on the input tape are not repeated in the decoder-transcriber 12, but rather are applied as an individual output to the add code unit 16. Thus, when an end of the line signal, such as a "return" or "return and elevate" signal is received by the decoder-transcriber 12, it provides activating signals on a "return" input to add code unit 16. It will be recalled that individual output leads are also provided to the add code unit 16 which provide actuating signals on one input whenever a hyphen code is received by the decoder-transcriber and on another input whenever a character code is received.

Whenever a return code actuating signal is provided to the add code unit 16 and the immediately preceding code in the transcriber has provided a hyphen signal to this unit, this indicates an end of line in the original copy which occurred in the middle of a word and hence was hyphenated. The output copy should then eliminate the hyphen and include the next character (which would be the following letter within the word) without adding any space. Thus, upon receipt of this combination of a return code preceded by a hyphen code the add code unit 16 provides no signals to the shift register and on the next clock pulse the subsequent character code will be entered into the shift register.

If, on the other hand, the code immediately preceding a return code is a normal character then the character input to add code unit 16 will have been actuated just preceding the actuation of the return lead signifying that the end of line in the original copy occurred at the end of a word. In this instance, a space must be provided between the end of this word and the beginning of the next word in order that the two words are not run together in the output copy. Thus, upon receipt of a signal combination representing a return code preceded by a character code, the add code unit 16 introduces into the shift register 13 a code reprsenting a space band. Simultaneously, with the provision of the space band code to shift register 13, the add code unit 16 provides a signal to the space band width assignment unit 14 so that the additional width of this added space band will be included in the computation of line length for the output copy.

As previously mentioned, the hyphen code is not repeated to the shift register 13 by the decoder-transcriber 12. However, when the input copy includes a properly hyphenated word (in contrast to an end of the line hyphen), the hyphen should also appear at this same point in the output copy. Thus, when the add code unit 16 receives an actuating signal on its hyphen line and the next following signal actuates its character line, the add code unit provides an output code representing a hyphen which is entered into the shift register before the entry of the next character, which is delayed in the usual fashion in passing from the decoder-transcriber 12 into the shift register. Here again, the add code unit 16 simultaneously provides a signal to the mat width assignment unit 15 in order that the hyphen added to the output copy will be properly computed in the mat width assignment unit.

The other situation in which the normal flow of coded information is interrupted occurs when the predetermined line length for the output copy is reached. There are three types of line endings. The line ending may be one which will initiate "automatic line ending," one which will require operator intervention in a semi-automatic line ending; or a line ending a paragraph.

The automatic line ending occurs when an interword code has been received after the limit on counter 18 is reached, but before the limit of counter 17 is reached. This is accomplished by providing an output signal from counter 18 indicating its overflow to the line completion unit 33 to which is also provided a signal directly from the decoder-transcriber 12, indicating the presence of an interword code, such as a space band, in the decoder-transcriber. If an interword code is received by the line completion unit 33 after the limit signal from counter 18, but before the limit signal from counter 17, a circuit is actuated, which upon receipt of the limit signal from counter 17, provides an actuating signal to reader 11 and to recognition unit 41, which in turn provides a signal to control 32. The signal to reader 11 stops the flow of input tape, while the signal to recognition unit 41 initiates the end of a line sequence. After the signal is provided to recognition unit 41, the shift register continues to shift codes down through it into the switching circuit 40 and then to the output encoder 6 until the last interword before the characters which filled counter 17 reaches the recognition circuit 41. At this point, the recognition circuit provides an output signal to the encoder 6 representing a "return and elevate" code which will now be coded onto the output tape. This return and elevate code when applied to typesetting equipment with Shaffstall equipment, or its equivalent, indicates that each interword point in the line calls for a single space band. Another signal from output recognition circuit 41 is coupled to the readout control unit 32. Upon receipt of the signal from recognition unit 41, readout control unit 32 provides output signals to the line measure preset unit 31 causing the width assignment counters 17, 18, 19, and 20 to be reset to their effective zero and preparing the apparatus for a new line. A slightly delayed signal is then provided from readout control 32 to the start reader unit 35 initiating once more the flow of input tape through the reader 11.

The situation at the line termination becomes somewhat more complicated, however, when no interword code occurs between the overflow of counter 18 and counter 17. The character, the width assignment for which, filled up counter 17, represents an "over-set" of the desired output line length. The line must then be terminated at a character preceding this oversetting character. The line, under these circumstances, may be terminated at the last previous interword or a hypen may be inserted between the last interword and the point of overset—with or without increasing the spacing between the words. In the system illustrated in FIG. 2, the decision to hyphenate or use the previous interword is made by operator intervention and the necessity of adding to the interword spaces is then automatically determined.

When counter 17 overflows providing an output signal to line completion unit 33, the entire apparatus including the shift register 13 is stopped. The visual indicator on the copy display unit 23 now indicates the oversetting character. The intervention control 30 has a series of push buttons mounted on it; for example, six buttons, numbered one through six and one button labeled "interword." The operator reading back from the illuminated "overset" indicator will select an appropriate point for hyphenation or in his discretion the previous interword point. If, for example, the appropriate hyphenation point occurs four characters preceding the overset character, then the operator would push button four to provide for a hyphen at this point. If he selects the last previous interword as the appropriate point for line termination then he pushes the "interword" button. This selection of a hyphenation point by the operator provides a signal through readout control 32 to recognition circuit 41 and to the ninth channel of shift register 13 for identification of the selected character. The readout control 32 then reinitiates the action of the shift register to process the codes included in its storage into the output encoder 6. When the code in the ninth channel indicative of the hyphenation point arrives at the recognition circuit 41, this circuit provides immediately thereafter a signal to the output encoder entering a hyphen code into this latter unit.

The recognition unit 41 also senses the signals stored in the seventh and eighth channels of shift register 13. If the last signal sensed before the line termination point is one indicating the overflow of counter 20, then the recognition unit 41 causes two additional "return" codes to be encoded by the output encoder 6 after the hyphen and then the normal return and elevate codes are encoded. If, however, the last signal sensed before the line termination point indicates the overflow of counter 19, the recognition unit 41 causes a single additional return code to be encoded following the hyphen before the normal return elevate code. If the last code sensed is indicative of the overflow of channel 18, then recognition unit 41 will cause only the normal return and elevate codes to be encoded onto the output tape. With equipment such as Shaffstall "Selecto-Spaces" or its equivalent, the two extra return codes will call at the typesetting machine for a space band and an en space; one extra return code will call for one space band and a thin space; and the usual single return code will call for only a space band. If there is no signal in either channel 7 or 8 prior the line termination point, then this indicates that the selected intervention point precedes the character which filled up counter 20 and a "stop" code is added after the "return" code. The "stop" code will then signify at the typesetting machine that extra spacing is required.

The recognition unit 41 signals switching circuit 40 so that the remainder of the codes stored in the shift register are applied to the input of decoder-transcriber 12. The recognition unit also provides a signal to readout control 32 indicating the completion of the line and readout control 32, as in the previous instance, resets the apparatus for the beginning of a new line. Thus, the stored codes which are being re-applied to the input of decoder-transcriber 12 are recomputed as to width assignment for determining the width of the next line in which they will be included.

The third type of line ending occurs when the end of a paragraph is reached. In this instance, the end of a line in the input copy coincides with the end of the line on the output tape. When add code unit 16 receives a signal indicating a return code immediately followed by a signal indicating a fixed-space code, this indicates the end of a paragraph. The add code unit 16 will then generate an end of line code which when detected by the recognition unit 41, will result in a quad left and a return and elevate code. The add code unit also generates a fixed space code and enters this into shift register 13 to provide for the proper indentation of the following paragraph. If any of the counters 18, 19, and 20 have reached their limits, showing that the line already contains enough characters and spaces for normal justification, recognition unit 41 will not generate a quad-left code. Only the return, the elevate and the fixed space code will be entered into shift register 13.

*Apparatus*

The data processing system has been described above in terms of the functional characteristics of the various units. Many of these units are commercially available units, while others constitute logic circuits which are conventional in the computer and logic art. FIGS. 3 through 7 illustrate one example of conventional logic arrangements suitable for use in this system.

Figure 3:
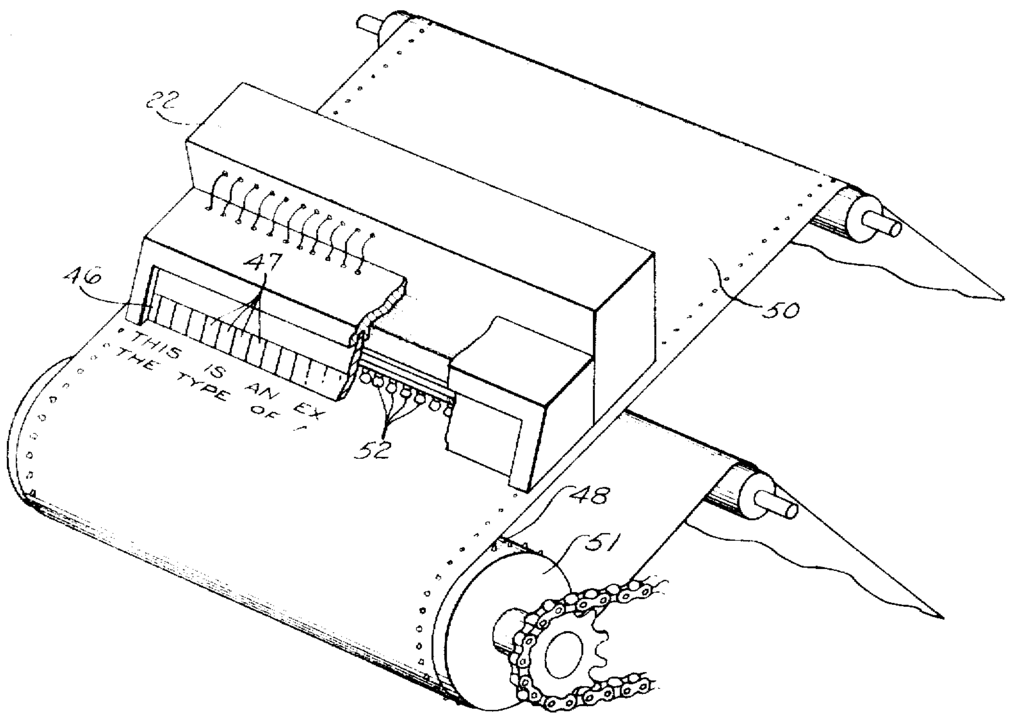
FIG. 3 is an illustration in perspective of the copy display and control panel of the apparatus illustrated in FIG. 2.

Referring now to FIG. 3, a hard copy counter and copy display unit suitable for use in the apparatus of this invention is shown. In the preparation of the input tape in the usual type of machine, such as a Flexowriter (Friden), not only is coded tape generated, but also typewritten copy corresponding to the coded tape is generated. The display unit in FIG. 3 is arranged to display this hard copy line by line and, as each character in the line is received at the input of the decoder-transcriber (FIG. 2), to provide a visual indication of the position of this character in the line on the hard copy.

The hard copy sheet 50 is fed over a platen 48 by means of sprocket wheels 51 which engage perforations in the margins of the hard copy 50. A grating 46 extends parallel to and horizontally across the length of the platen 48 just above the edge of the copy sheet 50. The grating 46 is formed with a series of vertical slots 47 across its length, each spaced apart by the width of the character on the hard copy. Behind each slot is mounted a bulb 52 (as shown in the broken-away portion). Each of the bulbs 52 is individually connected to the hard copy counter 22 such that the bulb behind the first of the slots 47 on the left-hand margin is energized before the hard copy counter receives its first signal, the second is energized, and the first is extinguished when the hard copy counter receives the first signal, and so on until the hard copy counter is reset at the end of each hard copy line; and at this point, the sprockets 51 are indexed, moving the hard copy up by one line with the left-most light again indicating the first character. Thus, the hard copy display provides a direct visual indication of the character being received at the decoder-transcriber unit, and when the reader stops, provides a visual indication of the character which overflowed counter 17 in FIG. 2. If desired, the display unit may also be arranged to illuminate a number of prior characters corresponding to the total range of the intervention control. The operator can then observe at a glance the range of points where he may insert a hyphen. While the display unit above described displays "hard copy," any display unit which shows enough of the informational content of the input copy material in its input form to make the hyphenation decision may be used. Such device may, for example, include "imaging screens" and the like.

Figure 4:
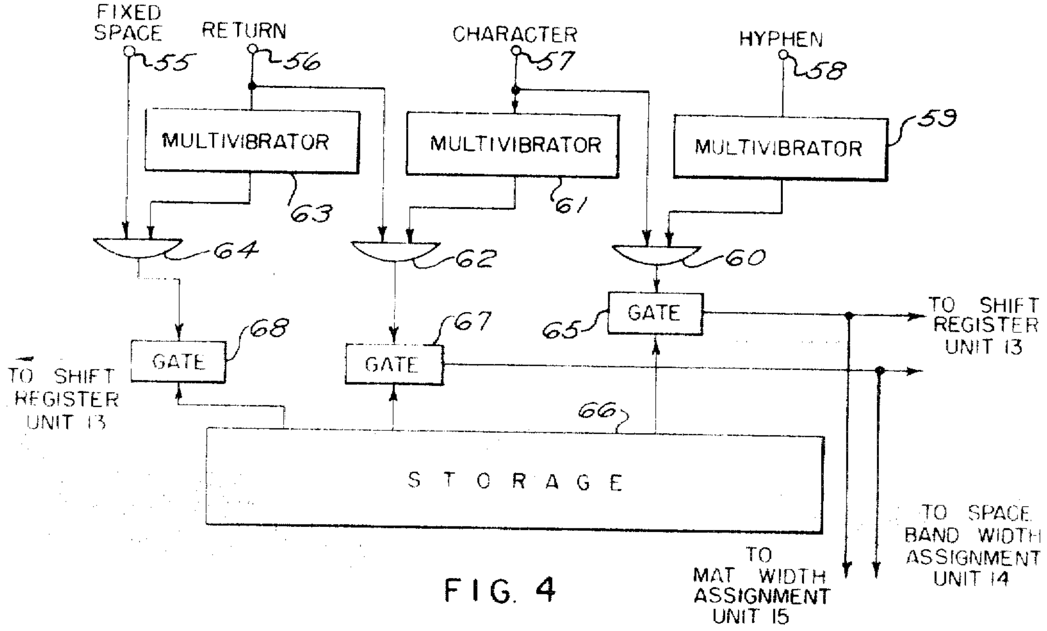
FIGS. 4, 5, 6, 7, and 8 are detailed block diagrams of specific portions of the apparatus illustrated in FIG. 2.

Referring now to FIG. 4, there is illustrated an add code unit suitable for use in the system of FIG. 2. The add code unit has four input leads 55, 56, 57, and 58 labeled respectively fixed space, return, character, and hyphen. These inputs 55–58 are supplied from decoder-transcriber 12. The hyphen input 58 is coupled directly to the input of multivibrator 59. The multivibrator 59 in response to a signal on hyphen input 58 provides a fixed duration output pulse, having a duration equal to or in excess of the time required for the decoder-transcriber 12 to translate two characters. The output of multivibrator 59 is provided to one input leg of AND gate 60. The other input leg of AND gate 60 is coupled directly to the character input 57. The character input 57 is also coupled to an input of a second multivibrator 61 having the same characteristics as multivibrator 59. The output of multivibrator 61 is provided to one input leg of AND gate 62, the other input leg of which is coupled directly to the return input 56. Return input 56 is one coupled directly to the input of a third multivibrator 63, again having the same characteristics as multivibrators 59 and 61. The output of multivibrator 63 is provided to one input leg of a third AND gate 64, the other input leg of which is coupled directly to the fixed spaced input 55.

The output of AND gate 60, which occurs whenever there is a coincidence between a signal from character input 57 and from the multivibrator 59, is applied to gate 65. Gate 65 is a binary-type gate which is opened by the signal from AND gate 60 and, when opened, allows transmission of signals from a specific address in storage unit 66. Gate 65 stays on a predetermined amount of time, which is arranged to be sufficient for all of the information from the address in storage unit 66 to be transmitted through gate 65. Storage unit 66 may be formed of any suitable information storage device having independent addresses and capable of being read out without destroying the information contained therein. This storage unit 66 may, for example, be formed of a magnetically coded drum having independent pickoffs for independent addresses. The output of gate 65 is provided both to shift register 13 and to mat width assignment unit 15. The output to shift register 13 is applied to the first six channels of that unit, as described in the description of the system in FIG. 2. Thus, the output from gate 65 may constitute six parallel lines.

In similar fashion, the output of AND gate 62 provides an actuating input to gate 67, which is coupled to a different address in storage unit 66. In the instance of gate 67, the output through this gate is provided to both shift register 13 and space band width assignment unit 14. The output of AND gate 64 is coupled to a third gate 68, which again represents a third independent address and storage unit 66 and which provides for transmission of signals from storage unit 66 to the shift register 13.

A unit such as that illustrated in FIG. 4 performs the functions described previously in connection with the operation of the add code unit 16. Thus, the storage address corresponding to gate 67 is arranged to provide, as an output signal, a code representing a space band. A return signal from decoder-transcriber 12 preceded by a character signal will then provide a space band output. In similar fashion, if the address corresponding to gate 65 contains a code representing a hyphen, then a hyphen followed by a character code will provide, as an output into the shift register 13, the code representing a hyphen. The character code then is entered in the usual manner. If the decoder-transcriber 12 provides an output sequence of a return followed by a fixed space, indicative of a paragraph ending, then the information stored in storage unit 66 at the address of gate 68 is an end-of-the-line signal which is provided to channel 9 in shift register 13 followed by a code representing a fixed space which is entered into the first six channels of shift register 13.

Figure 5:
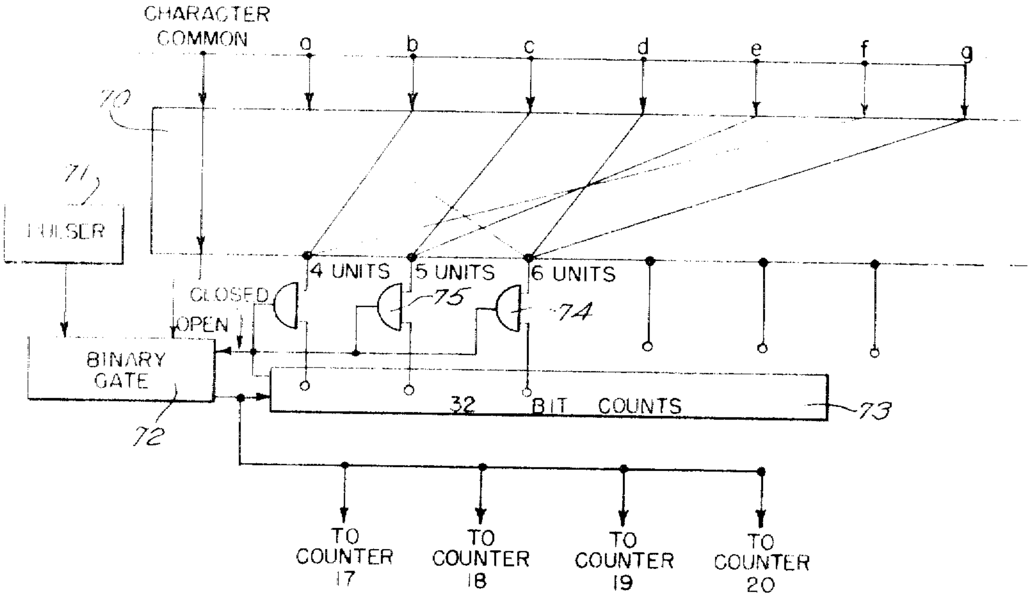

Turning now to FIG. 5, there is illustrated a circuit arrangement suitable for operation as the mat width assignment unit 15 of FIG. 2. The function of the mat width assignment unit 15 is to provide to the output counters 17, 18, 19, and 20 numerical codes corresponding to the width value of each character as it is processed through the decoder-transcriber 12. The mat width assignment unit may be arranged to include a terminal strip 70 having as inputs the eighty-two individual character leads from the case recognition unit 21 and the eight leads directly from the decoder-transcriber 12. In any given typographical case, the relative values of these characters may be expressed in thirty-two incremental values. Several of the characters have the same value, and it is the function of the terminal board 70 to provide common output lines for those inputs which have the same width value. Thus, by way of example, the input lines representative of the characters A, B, C, D, E, F, and G are shown, and it is seen that for these characters, three outputs corresponding to 4, 5, and 6 units are provided. The same arrangement follows for the remainder of the characters such that the maximum number of outputs from this terminal board is 32 for the 90 individual inputs. In order to provide for computation of line length and total cumulative character width for a different type face, a different terminal board corresponding to the width values for the different type face may be substituted.

While there are a relatively large number of ways in which the individual, numerically designated output leads from terminal board 70 may be utilized to generate discrete numbers of pulses into the output counters 17, 18, 19, and 20, a particular arrangement is shown by way of example. A pulser 71, which is operating at a pulse rate which is fast compared to the clock pulse rate of the overall system of FIG. 2, provides output pulses to a binary gate 72. This binary gate 72 is normally in the state where pulses from pulser 71 are not passed; however, it is opened each time that the character common input to the mat width assignment unit 15 is actuated. When the binary gate 72 is opened, pulses from pulser 71 pass through it to the input of a 32-bit counter 73. The 32-bit counter has coupled to it at individual count levels AND gates. As shown, AND gate 74 has one input leg coupled to the fixed count level in counter 73 and the other input leg coupled to the individual output from terminal board 70 representing six units. In a similar fashion, AND gate 75 has one input leg coupled to a 5-level output in the counter 73 with the other leg connected to the 5-unit output from terminal board 70. The output of binary gate 72 is also provided to the inputs of counters 17, 18, 19, and 20.

In operation, then, if a character (for example, character A) is translated in the decoder-transcriber 12, then a character common output is provided which opens binary gate 72. Since the individual input line labeled A is actuated, then the pulses through binary gate 72 are accumulated in 32-bit counter 73 until the six level is reached. At this point, the coincidence between the pulse at the six level in bit counter 73 and the actuating signal on the sixth unit output lead from terminal board 73 provides an output from AND gate 74. The output from each of these AND gates is provided back to the binary gate 72 and closes this gate. Thus, the operation is that pulses are provided both to the bit counter 73 and to the cumulative counters 17, 18, 19, and 20 until the six level is reached. For the letter A, then, six pulses are provided to each of the output counters 17, 18, 19, and 20. In the same fashion, an appropriate number of pulses may be transmitted to counters 17, 18, 19, and 20 for each character.

Figure 6:
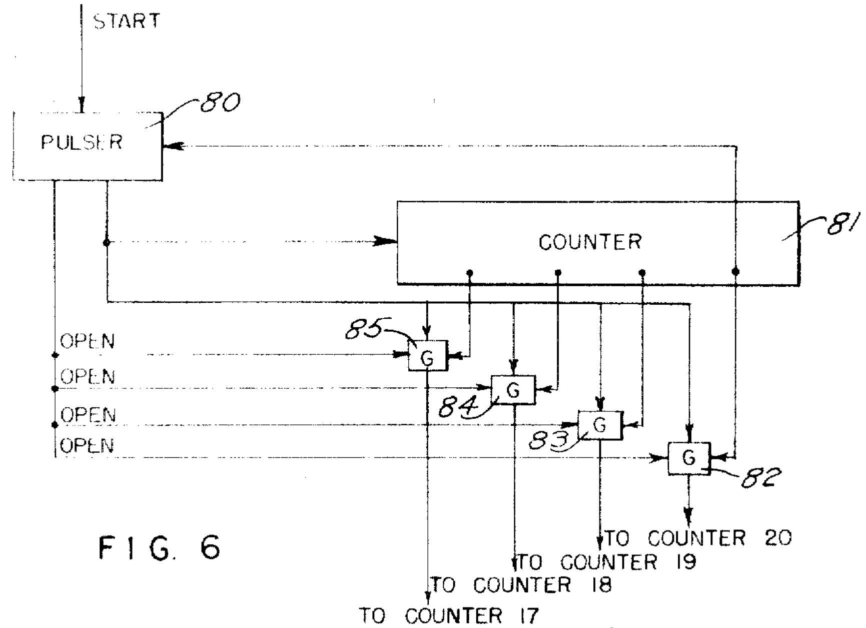

A circuit suitable for use as a space band width assignment unit 14 is illustrated in FIG. 6. The space band width assignment unit has the function of receiving input signals each time the decoder-transcriber translates a code representing a space band or each time the add code unit 16 generates a space band signal. In response to this input actuating signal, the space band width assignment provides four output signals, each output signal going to a different one of the cumulative counters 17, 18, 19, and 20. Each of the output signals represents a different numerical value since the counters 17, 18, 19, and 20 provide, as previously described, for different width assessments of the interword spaces. The input signal to the space band width assignment unit 14 turns on a pulser 80 which provides output pulses to a counter unit 81 and through individual gates 82, 83, 84, and 85 to counters 20, 19, 18, and 17, respectively. The gates 82–85 may be regarded as normally open gates, and hence when the pulser 80 first provides output pulses, these pulses are coupled simultaneously through their respective counter gates and to the input of counter 81. When the numerical point representative of the minimum space band width is reached, then an output is provided from counter 81 which closes gate 85. In similar fashion, the gates 84, 83, and 82 are successively closed in response to a total accumulation of pulses in counter 81 corresponding to the respective numerical values of maximum space band, maximum space band plus a thin space, and maximum space band plus an en space, respectively. The signal which closes gate 82 may also be used to turn off pulser 80 until the receipt of the next space band signal. The turning off of pulse 80 may be used to again change the state of each of the gates 82, 83, 84, and 85 to their open condition in preparation for receipt of the next space band signal.

Figure 7:
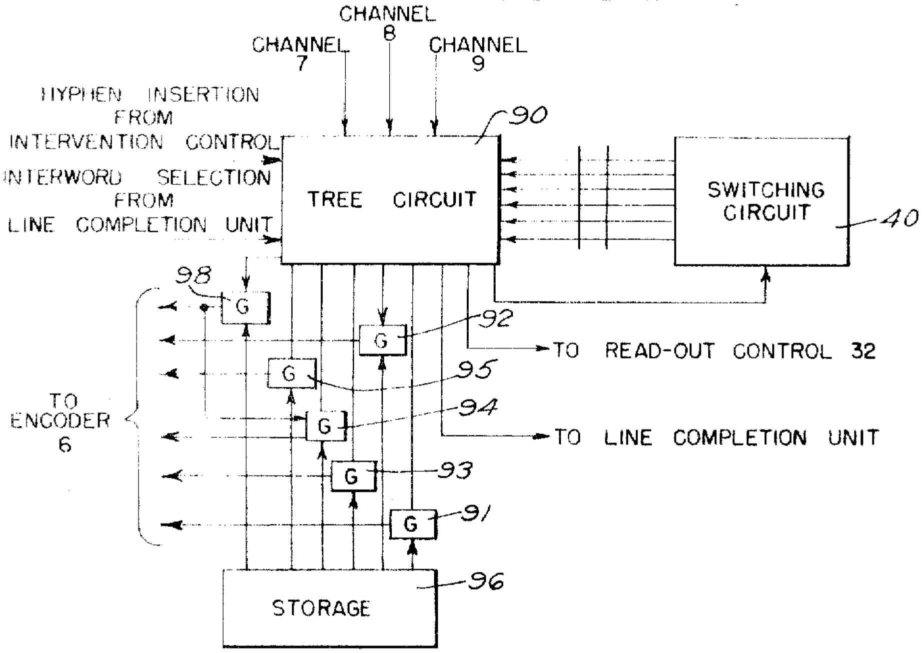

Referring now to FIG. 7, an arrangement of units suitable for use as the recognition circuit 41 shown in the system of FIG. 2 is illustrated. A tree circuit 90 has coupled to it as inputs channels 7, 8, and 9 from the shift register 13. The tree circuit 90 may be formed of any suitable circuit elements in the fashion well known in the computer art. In general, the tree circuit accepts inputs which may be regarded as a 3-bit code on channels 7, 8, and 9 and provides individual output leads for specific codes. In addition to the inputs of channels 7, 8, and 9, two inputs are provided to the tree circuit 90 from the intervention control 30 through the readout control 32. These two inputs are a signal indicating that the intervention control has been operated to insert a hyphen and a signal input to select the last previous interword before the overflow of counter 17. In addition to the above inputs, the first six channels of shift register 13 provide an output signal through switch circuit 40 to the tree circuit 90.

Individual output leads are supplied from the tree circuit 90 to the readout control unit 32, the switching circuit 40, and to line completion unit 33. Six other output leads are provided from the tree circuit 90 to gates 91, 92, 93, 94, 95, and 98. These gates serve as individual address points for storage unit 96. Storage unit 96 is formed from any suitable memory storage providing specific output code signals at each of the address points. As in the case of the add code unit 16, this storage is a permanent storage, that is, the information is retained in storage and is not erased by readout. Each of the gates 91, 92, 93, 94, 95, and 98 are normally closed, but they are opened by the actuation of the line from tree circuit 90 connected to them; with the period they are open being sufficient to completely read out the information stored at the particular address. The output of each of these gates is provided directly to the output encoder unit 6.

In this tree circuit 90, the input channels corresponding to channels 7 and 8 from shift register 13 include a memory effect such that they always contain the last signal received by them during the time when a line is being processed. They are reset at the conclusion of a line. As described above, the channels 7 and 8 contain coding indicating the overflow of counters 18, 19, and 20. If a code is adopted in which a bit is placed in channel 8 when counter 20 overflows, a bit is placed in channel 7 when counter 19 overflows; and a bit is placed in both channels 7 and 8 when counter 18 overflows, then the coding on these two channels for these situations respectively would be 10; 01; and 11. As described above in connection with the operation of the system, the termination of a line either automatically or semiautomatically is accomplished by placing a bit in channel 9 corresponding to the terminating character. In the event of a paragraph line ending with none of the counters 17, 18, 19, and 20 have been filled, a bit will appear only in channel 9.

Tabulated below are the appropriate output codes from the storage unit 96 corresponding to input codes for each of the four above-listed situations.

Tree circuit 90 also contains a recognition circuit which operates on the output from the first six channels from the shift register 13. When these channels carry a code representing an interword, an output is provided to line completion unit 33. The second function of the input from the first six channels of shift register 13 to the tree circuit 90 is to provide a signal to the switching circuit 40 when all of the information in the shift register has been shifted out back to the input of decoder-transcriber 12. Thus, when a shift occurs in the shift register 13 and no code is provided to the input of tree circuit 90 in these six channels, the tree circuit 90 provides an output signal which switches circuit 40 back to the input of output encoder 6.

When the interword selection input to tree circuit 90 is actuated, then it provides a signal on the channel 9 entry into the tree circuit indicating a line termination.

The operation of the "last interword" selection will become apparent from the description of the line completion unit below.

Figure 8:
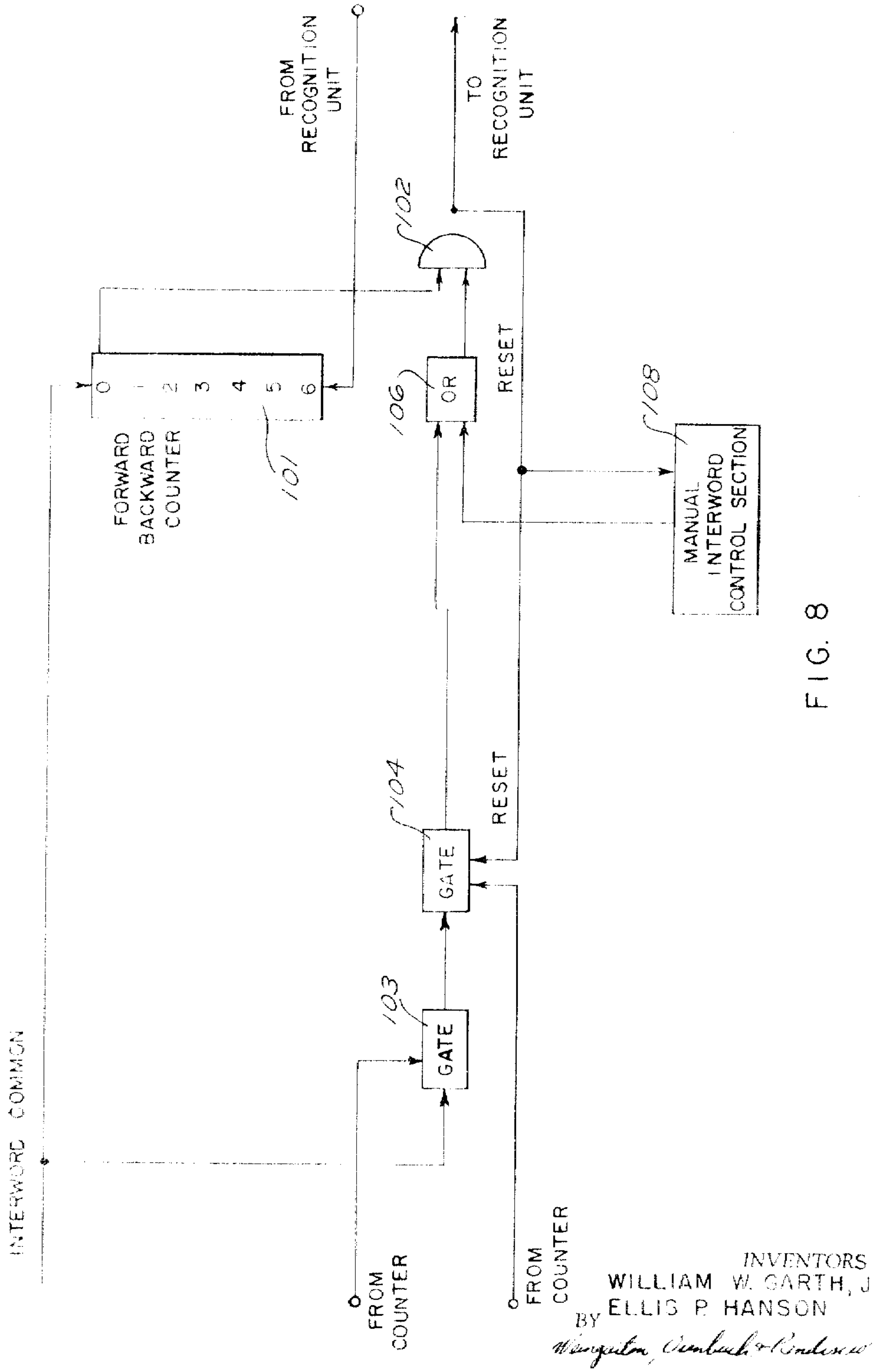

With reference to FIG. 8, a convenient circuit arrangement for line completion unit 33 is shown. A forward-backward counter 101 receives its forward driving input from the interword common output of decoder-transcriber 12 and its backward driving input from recognition circuit 41. The total capacity of this counter is arranged to be larger than the number of interwords which may be stored in shift register 13 at any one time. An output is provided from the counter 101 whenever the count changes from the "1" to the "0" position, indicating that the last inter word code entered into shift register 13 has reached recognition circuit 41. This output is coupled to one input leg of AND gate 102. The other input leg of AND gate 102 is actuated by the output of OR gate 106. When both inputs of AND gate 102 are actuated, an output signal is provided which actuates the "interword selec-

TABLE I

| Input | | | Output | | |
|---|---|---|---|---|---|
| Ch. 9 | Ch. 8 | Ch. 7 | To Encoder 6 | Readout 32 Control | To Switching Unit 40 |
| 1 | 1 | 1 | Return plus Elevate.. | Terminate and Reset. | Switch output of shift register to the decoder-transcriber. |
| 1 | 0 | 1 | Return; Return and Elevate. | .....do............... | Do. |
| 1 | 1 | 0 | Return; Return; Return and Elevate. | .....do............... | Do. |
| 1 | 0 | 0 | Quad left; Return Elevate. | .....do............... | Do. |

Typically, then, gate 91 would be actuated by the first combination; gates 92, 93, and 94 by the second, third, and fourth combinations respectively.

When a line is semiautomatically ended by the operator inserting a hyphen at a selected point, then the operator's selection identifies the line ending character by placing a bit in the ninth channel. Simultaneously, the hyphen insertion input to tree circuit 90 is actuated. When this input is actuated, it addresses gate 95 in the storage unit 96 and provides for the generation of a hyphen code prior to the transmission of the code which is appropriate for the 3-bit input as indicated by the above table. In one instance, however, the operation is varied from this pattern, that is, when the channel 9, 8, and 7 input code is 1; 0; 0 and a hyphen is inserted. In this case, the operator has inserted a hyphen at a point prior to the overflow of any of the counters 16, 18, 19, and 20. This combination in tree circuit 90 actuates an output line to gate 98, which, after the insertion of the hyphen through gate 95, blocks the output of gate 94 and addresses a position in storage unit 96 which generates an output code to encoder 6 of "Return; Stop," thus signalling the line casting operation to insert extra spaces.

tion" input of recognition unit 41, as described in conjunction with FIG. 7. OR gate 106 may be actuated either by a signal from the manual interword control section 108 of intervention control 30, or by the output of gate 104.

Gate 104 is a coincidence gate having two stable states. When both inputs of gate 104 are actuated, it provides an output pulse and remains in this state until it receives a signal on its reset input. This reset signal is provided from the output of AND gate 102. In its reset condition, no output is provided from gate 104. One of the input legs of gate 104 is actuated by an output from gate 103, and the other is actuated by the overflow signal from counter 17. Gate 103 is a coincidence element having two stable states. When both inputs of gate 103 are actuated, it provides an output signal. One of these inputs is from the interword common lead while the other is actuated when counter 18 has reached its limit and remains so until the termination of the line resets counter 18. Gate 103 is arranged such that once actuated it remains in that state until the input signal from counter 18 is removed. This arrangement then provides that gate 103 is actuated when an interword occurs after the overflow of counter 18. When counter 17 overflows and gate 103 is actuated, then gate 104 is actuated, thus energizing one input of AND gate 102. When the last interword before the overflow of counter 17 arrives at recognition unit 41, the forward-backward counter 101 will go from "1" to "0," thus energizing the second input leg of AND gate 102, which provides the line ending signal automatically to recognition unit 41.

The remainder of the units illustrated in FIG. 2 are also completely conventional circuitry such as counters 17, 18, 19, and 20 and shift register 13 or are commercially available units. The reader unit 11 is a commercially available tape reader providing electrically coded output signals, being available, for example, from Rheem Electronics of Los Angeles, California. The output encoder 6 is again a standard commercial unit, such as the Teletype Unit BRPE. Units such as the case recognition unit 21 incorporate simple coincidence circuits.

The case recognition unit 21 has provided to it the 41 character codes which have different width values in the upper and lower case. In addition, decoder-transcribed 12 provides to this unit a signal indicative of an upper case control code. The case recognition unit then incorporates a series of switches actuated by the upper case control code in such a manner that when there is no upper case, the 41 input leads are provided on one set of 41 output leads, and when the upper case signal is actuated, these same 41 input leads are provided on a second different set of 41 output leads.

The above-described specific examples of circuit configurations should not be construed as limiting the apparatus. These specific configurations are described as conventional examples only, of one manner of arranging the circuit logic. As is well known in the computer art, there are a great variety of circuit arrangements which may also be used to accomplish these functions.

The data processing apparatus and system has been described as it would be arranged for operation in conjunction with Shaffstall equipment. However, the storage capacity of the shift register 13 may be increased so that it will contain all the characters and other codes of any line to be produced. In this case, the selection of a hyphenation point by the monitor operator using intervention controls 30 will cause readout control 32 and recognition circuit 41 to activate output encoder 6 to provide appropriate spacing signals at the interword points in the line, as the line is read out of the shift register 13. In such a configuration, the output tape would then contain all spacing signals at the interword points and could be fed directly to a typesetting machine, without any requirement of Shaffstall equipment or its equivalent.

In such a configuration, if all of the codes of any line are contained in the shift register 13 and the monitor operator's selected hyphenation point lies outside the range where justification may be achieved by interword expansion, then the summation counters will signal the readout control 32 and recognition unit 41 the proper number of thin spaces to be called for between characters on the output tape to accomplish justification by letter spacing and interword expansion.

The apparatus may be made entirely automatic by increasing the capacity of shift register 13 sufficiently to contain all the characters of any possible line and replacing the copy display 23 and intervention controls 30 by a storage element. This storage element must contain all of the words which may appear on the input tape, together with hyphen codes at all possible points of hyphenation. Such a stored dictionary of words and their possible hyphenation points might be in the form of a storage in a magnetic drum or the like. Thus, when counter 17 overflows, the word involved would be compared with its equivalent in the storage "dictionary." Comparison circuitry would then select the preferred hyphenation point and signal readout control 32 automatically.

Having described the invention, various modifications and departures will now occur to those skilled in this art, and the invention herein should be construed as limited only to the spirit and scope of the appended claims.

What is claimed is:

1. Data processing apparatus for providing a series of output signals suitable for operating a typesetting machine to reproduce in properly terminated lines justified within a predetermined line length, copy material in word and paragraph form comprising, means for generating a series of sequential input code signals, each representing a significant composition element of said copy material;

translating means adapted to receive said input code signals, said translating means providing output signals in response to individual input codes;

display means controlled by said translating means and adapted to display said copy material in such a manner as to individually indicate each character of said copy material at the time the code signals representing said character is being received by said translating means;

data storage means coupled to said translating means and adapted to store sequentially a plurality of said code signals;

a coding element;

a computer means coupled to said translating means and adapted to accumulate for each of said input code signals as it is received by said translator the width value for the respective character or space corresponding to said code, said computer means being adapted to provide an output indication identifying which of said code signals are within justification range of said predetermined line length and to provide an overset indication identifying the one of said code signals, the width value for which, exceeds said predetermined line length, said data storage means being adapted to sequentially transfer said plurality of stored code signals to the input of said coding element and to stop said transfer in response to said overset indication from said computer element, said coding element being adapted in response to said transferred code signals to provide a series of output signals adapted to operate a typesetting machine;

line termination means adapted to recommence transfer of said stored code signals to said coding element when a code representing an interword lies within said justification range and to stop said transfer and terminate said line when the last one of said interword codes within said justification range has been transferred, said line termination means being adapted when no code representing an interword lies within said justification range to be manually operated to insert a hyphen code after a preselected code and to transfer all of said codes in said storage prior to said hyphen to said output coding element and to terminate said line.

2. Data processing apparatus for providing a series of output signals suitable for operating a typesetting machine to reproduce in properly terminated lines justified within a predetermined line length, copy material in word and paragraph form comprising, means for generating a series of sequential input code signals, each representing a significant composition element of said copy material;

translating means adapted to receive said input code signals, said translating means including individual output leads corresponding to each individual input code, said translating means being responsive to each of said individual input code signals in a manner to provide an actuating signal on the corresponding one of said output leads, said translating means also including a code repeater adapted in response to preselected ones of said input code signals to repeat said input code signals on an independent output;

display means controlled by said translating means and adapted to display said copy material, said display means including an indicator for individually indicating each character of said copy material at the time the code signal representing said character is being received by said translating means;

a coding element;

a computer means coupled to said translating means and adapted to accumulate for each of said input code signals as it is received by said translator the width value for the respective character corresponding to said code, said computer means being adapted to provide an output indication identifying which of said code signals are within justification range of said predetermined line length and to provide a further overset indication identifying the one of said code signals, the width value for which exceeds said predetermined line length;

data storage means coupled to said repeater output of said translating means and adapted to store sequentially a plurality of said repeated code signals;

said data storage means being adapted to sequentially transfer said plurality of stored code signals to the input of said coding element and to stop said transfer in response to said overset indication from said computer element, said coding element being adapted in response to said transferred code signals to provide a series of output signals adapted to operate a typesetting machine;

line termination means adapted to recommence transfer of said stored code signals to said coding element when a code representing an interword lies within said justification range and to stop said transfer and terminate said line when the last one of said interword codes within said justification range has been transferred, said line termination means being adapted when no code representing an interword lies within said justification range to be manually operated to insert a hyphen code after a preselected code and to transfer all of said codes in said storage prior to said hyphen to said output coding element and to terminate said line, said output coding element being adapted to provide as final signals for each of said lines signals conveying to said typesetting machine information for justifying said line in accordance with the width values accumulated in said computer up to said line termination.

3. Apparatus in accordance with claim 2 wherein said code repeater repeats all codes received at said input except those codes representing hyphens and line termination signals in said copy material and which includes an add code element coupled to said translating means and adapted, when said translating means receives a code representing a hyphen followed by a code representing a character, to insert into said storage means a code representing a hyphen in a sequential position immediately ahead of said following character code, said add code element being also adapted in response to each code representing a line terminating signal not preceded by a code representing a hyphen in said copy material to insert into said storage means a code signal representing an interword character in the same sequential position said line terminating signal occupied in said sequence of input code signals.

4. Apparatus in accordance with claim 1 wherein said computer means comprises a plurality of independent counting elements, means providing to each of said counting elements for each of said input codes representing a non-interword character, a width value corresponding to the width value of said character in said typesetting machine, said means providing for each input code representing an interword character a different width value to each of said counter elements corresponding to the appropriate width value for a different justification operation at said typesetting machine, each of said counters being adapted to provide an output signal when the total of accumulated width values reaches a predetermined limit corresponding to said predetermined line length, said one of said counters to which is provided width values corresponding to said typesetting machine justification operation providing minimum interword spacing generating said overset indicating signal when it reaches said predetermined limit.

5. Apparatus in accordance with claim 4 wherein each of said plurality of counters provides an identifying signal to said storage means indicating which of said input code signals corresponds to the character, the width assignment for which caused the respective one of said counters to reach said predetermined limit; and which includes a recognition element adapted to provide an output signal indicating the last one of said counters to reach its predetermined limit prior to line termination whereby said typesetting machine may be operated to perform the one of said justification operations corresponding to said interword width values provided to the said last one of said counters.

6. Apparatus in accordance with claim 1 and including a switching element at the output of said storage means adapted to transfer any coded signals remaining in said storage means after the termination of each of said lines back to the input of said translating means prior to said input code generating means providing any further input signals to said translating means.

7. Apparatus in accordance with claim 3 wherein said add code unit, in response to code signal outputs from said translating means indicating a line terminating signal followed by a paragraph indenting signal, inserts into said storage means a code signal causing said typesetting machine upon receipt thereof to terminate said line and provide paragraph indentation for the next sequential one of said lines.

8. Apparatus in accordance with claim 1 wherein said line termination means may be manually operated, when it is desired to terminate a line outside the justification range of said typesetting machine, to provide a signal so indicating to said typesetting machine.

9. Data processing apparatus for providing from an input tape coded with signals representing copy material in word and paragraph form, an output tape coded with signals suitable for operating a typesetting machine to reproduce in properly terminated lines justified within a predetermined line length said copy material, comprising, a reader responsive to said input tape and adapted in response to said signals on said input tape to generate a series of electrical input code signals;

translating means adapted to receive said input code signals, said translating means providing output signals in response to individual input codes, said translating means also including a code repeater adapted in response to preselected ones of said input code signals to repeat said input code signals on an independent output;

display means controlled by said translating means and adapted to display said copy material, said display means including an indicator for individually indicating each character of said copy material at the time the code signal representing said character is being received by said translating means;

a coding element;

a computer means coupled to said translating means and adapted to accumulate for each of said input code signals as it is received by said translator the width value for the respective character corresponding to said code, said computer means being adapted to provide an output indication identifying which of said code signals are within justification range of said predetermined line length and to provide a further overset indication identifying the one of said code signals, the width value for which, exceeds said predetermined line length;

data storage means coupled to said repeater output of said translating means and adapted to store sequentially a plurality of said repeated code signals;

said data storage means being adapted to sequentially transfer said plurality of stored code signals to the input of said coding element and to stop said transfer in response to said overset indication from said computer element, said coding element being adapted in response to said transferred code signals to provide on said output tape a series of output signals adapted to operate a typesetting machine;

line termination means adapted to recommence transfer of said stored code signals to said coding element when a code representing an interword lies within said justification range and to stop said transfer and terminate said line when the last one of said interword codes within said justification range has been transferred, said line termination means being adapted when no code representing an interword lies within said justification range to be manually operated to insert a hyphen code after a preselected code and to transfer all of said codes in said storage prior to said hyphen to said output coding element and to terminate said line, said output coding element being adapted to provide as final signals for each of said lines signals conveying to said typesetting machine information for justifying said line in accordance with the width values accumulated in said computer up to said line termination.

10. Data processing apparatus for providing a series of output signals suitable for operating a typesetting machine to reproduce in properly terminated lines justified within a predetermined line length, copy material in word and paragraph form comprising, means for generating a series of sequential input code signals, each representing a significant composition element of said copy material;

translating means adapted to receive said input code signals, said translating means providing output signals in response to individual input codes;

data storage means coupled to said translating means and adapted to store sequentially a plurality of code signals;

a coding element;

a computer means coupled to said translating means and adapted to accumulate for each of said input code signals the width value for the respective character or space corresponding to said code, said computer means being adapted to determine which of said code signals are within justification range of said predetermined line length and to provide an overset indication identifying the one of said code signals, the width value for which, when added to the width values for the preceding characters and spaces in the line exceeds said predetermined line length, said data storage means being adapted to sequentially transfer said plurality of stored code signals to the input of said coding element, said coding element being adapted in response to said transferred code signals to provide a series of output signals adapted to operate a typesetting machine;

line termination means adapted, when a code representing an interword lies within said justification range, to stop said transfer and terminate said line when the last one of said interword codes within said justification range has been transferred;

display means for displaying and indicating the word within which occurs a character having a width value which, when added to the width values for the preceding characters and spaces in the line exceeds said predetermined line length;

said line termination means being adapted when no code representing an interword lies within said justification range to be manually operated to insert a hyphen code after a selected code and to transfer all of said codes in said storage prior to said hyphen to said output coding element and to terminate said line.

11. Data processing apparatus for providing a series of output signals suitable for operating a typesetting machine to reproduce in properly terminated lines justified within a predetermined line length, copy material in word and paragraph form comprising, means for generating a series of sequential input code signals, each representing a significant composition element of said copy material;

translating means adapted to receive said input code signals, said translating means including individual output leads corresponding to each individual input code, said translating means being responsive to each of said individual input code signals in a manner to provide an actuating signal on the corresponding one of said output leads, said translating means also including a code repeater adapted in response to preselected ones of said input code signals to repeat said input code signals on an independent output;

a coding element;

a computer means coupled to said translating means and adapted to accumulate for each of said input code signals the width value for the respective character corresponding to said code, said computer means adapted to determine which of said code signals are within justification range of said predetermined line length and to provide an overset indication identifying the one of said code signals, the width value for which when added to the width values for the preceding characters and spaces in the line exceeds said predetermined line length;

data storage means coupled to said repeater output of said translating means and adapted to store sequentially a plurality of said repeated code signals;

said data storage means being adapted to sequentially transfer said plurality of stored code signals to the input of said coding element, said coding element being adapted in response to said transferred code signals to provide a series of output signals adapted to operate a typesetting machine;

line termination means adapted when a code representing an interword lies within said justification range to stop said transfer and terminate said line when the last one of said interword codes within said justification range has been transferred;

display means for displaying and indicating the word within which occurs a character having a width value which, when added to the width values for the preceding characters and spaces in the line exceeds said predetermined line length; said line termination means being adapted when no code representing an interword lies within said justification range to be manually operated to insert a hyphen code after a selected code and to transfer all of said codes in said storage prior to said hyphen to said output coding element and to terminate said line, said output coding element being adapted to provide as final signals for each of said lines signals conveying to said typesetting machine information for justifying said line in accordance with the width values accumulated in said computer up to said line termination.

12. Apparatus in accordance with claim 11 wherein said code repeater repeats all codes received at said input except those codes representing hyphens and line termination signals in said copy material and which includes an add code element coupled to said translating means and adapted, when said translating means receives a code representing a hyphen followed by a code representing a character, to insert into said storage means a code representing a hyphen in a sequential position immediately ahead of said following character code, said add code element being also adapted in response to each code representing a line terminating signal not preceded by a code representing a hyphen in said copy material to insert into said storage means a code signal representing an interword character in the same sequential position said line terminating signal occupied in said sequence of input code signals.

13. Apparatus in accordance with claim 10 wherein said computer means comprises a plurality of independent counting elements, means providing to each of said counting elements for each of said input codes representing a non-interword character, a width value corresponding to the width value of said character in said typesetting machine, said means providing for each input code representing an interword character a different width value to each of said counter elements corresponding to the appropriate width value for a different justification operation at said typesetting machine, each of said counters being adapted to provide an output signal when the total of accumulated width values reaches a predetermined limit corresponding to said predetermined line length, said one of said counters to which is provided width values corresponding to said typesetting machine justification operation providing minimum interword spacing generating said overset indicating signal when it reaches said predetermined limit.

14. Apparatus in accordance with claim 13 wherein each of said plurality of counters provides an identifying signal to said storage means indicating which of said input code signals corresponds to the character, the width assignment for which caused the respective one of said counters to reach said predetermined limit; and which includes a recognition element adapted to provide an output signal indicating the last one of said counters to reach its predetermined limit prior to line termination whereby said typesetting machine may be operated to perform the one of said justification operations corresponding to said interword width values provided to the said last one of said counters.

15. Apparatus in accordance with claim 10 wherein said line termination means may be manually operated, when it is desired to terminate a line outside the justification range of said typesetting machine, to provide a signal so indicating to said typesetting machine.

16. Data processing apparatus for providing from an input tape coded with signals representing copy material in word and paragraph form, an output tape coded with signals suitable for operating a typesetting machine to reproduce in properly terminated lines justified within a predetermined line length said copy material, comprising, a reader responsive to said input tape and adapted in response to said signals on said input tape to generate a series of electrical input code signals;

translating means adapted to receive said input code signals, said translating means providing output signals in response to individual input codes, said translating means also including a code repeater adapted in response to preselected ones of said input code signals to repeat said input code signals on an independent output;

a coding element;

a computer means coupled to said translating means and adapted to accumulate for each of said input code signals the width value for the respective character corresponding to said code, said computer means being adapted to determine which of said code signals are within justification range of said predetermined line length and to provide an overset indication identifying the one of said code signals, the width value for which, when added to the width values for the preceding characters and spaces in the line exceeds said predetermined line length;

data storage means coupled to said repeater output of said translating means and adapted to store sequentially a plurality of said repeated code signals;

said data storage means being adapted to sequentially transfer said plurality of stored code signals to the input of said coding element, said coding element being adapted in response to said transferred code signals to provide on said output tape a series of output signals adapted to operate a typesetting machine;

line termination means adapted, when a code representing an interword lies within said justification range to stop said transfer and terminate said line when the last one of said interword codes within said justification range has been transferred;

display means for displaying and indicating the word within which occurs a character having a width value which, when added to the width values for the preceding characters and spaces in the line exceeds said predetermined line length; said line termination means being adapted when no code representing an interword lies within said justification range to be manually operated to insert a hyphen code after a selected code and to transfer all of said codes in said storage prior to said hyphen to said output coding element and to terminate said line, said output coding element being adapted to provide as final signals for each of said lines signals conveying to said typesetting machine information for justifying said line in accordance with the width values accumulated in said computer up to said line termination.

17. Apparatus in accordance with claim 10 and including a switching element adapted to transfer any code signals remaining in said storage means after the termination of each of said lines back to the input of said translating means prior to said input code generating means providing any further input signals to said translating means.

References Cited by the Examiner

UNITED STATES PATENTS

| | | | |
|---|---|---|---|
| 3,165,045 | 1/1965 | Troll | 340—146.1 X |
| 3,171,592 | 3/1965 | Hanson | 340—146.1 X |
| 3,248,705 | 4/1966 | Dammann et al. | 340—172.5 |

ROBERT C. BAILEY, *Primary Examiner.*

P. J. HENON, *Assistant Examiner.*